May 27, 1952  E. WILDHABER  2,598,327
METHOD AND MACHINE FOR CUTTING GEARS
Filed June 19, 1946  3 Sheets-Sheet 1

ERNEST WILDHABER
INVENTOR.

BY *(signature)*
Attorney

May 27, 1952   E. WILDHABER   2,598,327
METHOD AND MACHINE FOR CUTTING GEARS
Filed June 19, 1946   3 Sheets-Sheet 2

ERNEST WILDHABER
INVENTOR.

BY *Beshlinger*
Attorney

May 27, 1952 — E. WILDHABER — 2,598,327
METHOD AND MACHINE FOR CUTTING GEARS
Filed June 19, 1946 — 3 Sheets-Sheet 3

ERNEST WILDHABER
*INVENTOR.*

BY *B.F. Schlesinger*
Attorney

Patented May 27, 1952

2,598,327

UNITED STATES PATENT OFFICE 2,598,327

METHOD AND MACHINE FOR CUTTING GEARS

Ernest Wildhaber, Brighton, N. Y., assignor to Gleason Works, Rochester, N. Y., a corporation of New York Application June 19, 1946, Serial No. 677,813

17 Claims. (Cl. 90—7)

The present invention relates to tapered gears and particularly to the production of tapered gears which are to mesh with their axes inclined to one another at an angle of less than thirty degrees.

Tapered gears are ordinarily generated with reciprocating planing tools, or with face-mill or similar gear cutters in a generating operation in which the tool represents a crown gear or other tapered basic gear, and in which the tool and work are rolled relative to one another as though the gear being cut were rolling on the basic gear represented by the tool. To produce tapered gears which are to mesh with a small shaft angle, bevel or hypoid gear generating machines are ordinarily required which are altogether out of proportion in size to the size of the gears to be cut. While methods of cutting tapered gears of small shaft angle on machines of size proportionate to the size of the gears have been devised, these methods involve some complications.

A primary object of the invention is to provide a simple method for generating tapered gears of small shaft angle which may be practiced on a machine proportional in size to the gears to be produced.

Another object of the invention is to provide a method for correctly cutting tapered gears of small shaft angle with a tool of gear form.

A further object of the invention is to provide a method for cutting tapered gears of small shaft angles with a tool of gear form in which the tool used is different from the mating gear of the gear which is being cut.

Still another object of the invention is to provide a method for cutting a pair of tapered gears of small shaft angle with tools of gear form, which will permit of using tools of the same tooth number in the generation of both members of the pair.

A further object of the invention is to provide a method for cutting tapered gears of small shaft angle with tools of gear form by which suitable localization of tooth bearing or contact may be obtained when a pair of gears so produced are in mesh.

A still further object of the invention is to provide an improved form of gear cutting machine for cutting tapered gears with tools of gear form.

Other objects of the invention will be apparent hereinafter from the specification and from the recital of the appended claims.

In cutting a tapered gear according to the present invention, a cutting tool of cylindrical gear form is preferably employed. This tool may have its cutting teeth extending in the general direction of its axis, or it may have its cutting teeth arranged in helices about its axis. In one embodiment of the invention, the tool is so positioned relative to the work that its axis intersects the axis of the work and is preferably inclined to the work axis at the pitch angle of the work. In the cutting operation, the tool is reciprocated along its axis either with a straight line motion or with a helical motion depending upon whether it has straight or helical teeth, and as the cutter reciprocates in engagement with the work, the cutter and work are slowly turned about their respective axes in the inverse proportion of their tooth numbers.

Preferably, both members of a pair of tapered gears are cut with tools having equal tooth numbers. The tools represent straight spur or helical gears which differ from the mating gear to the gear being cut. Cutters of suitable and standardized size may be used which need not bear any direct relationship to the size of the two members of the gear pair.

The amount of ease-off of the tooth bearing at the ends of the teeth of the mating gears, that is, the amount of localization of the tooth bearing or contact between the tooth surfaces of the mating gears, may be controlled to a limited degree through suitable selection of the diameters of the cutting tools. In a modification of the invention, however, complete control over tooth bearing may be achieved by so positioning the cutter with reference to the work that the axes of the cutter and work are not in the same plane but are angularly disposed to and offset from one another. With this arrangement, it is possible to vary the amount of tooth bearing or contact between the mating tooth surfaces of the mating gears by changing the amount of offset of work and tool axes.

Figure 1:
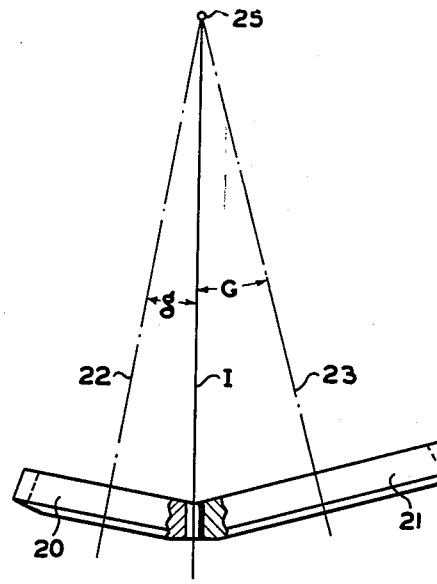
Fig. 1 is a diagrammatic view showing a pair of angular bevel gears of small shaft angle produced according to this invention in mesh.

Referring now to the drawings, 20 and 21 denote, respectively, the two members of a pair of angular bevel gears produced according to one embodiment of this invention. The axes of these gears are desingated 22 and 23, respectively. The gears have pitch angles $g$ and $G$, respectively, and mesh along an instantaneous axis I which intersects axes 22 and 23 of the gears in the common apex 25 of the gears.

As will be seen, the distance from the cone apex 25 of the gears to a mean point P along the length of a tooth of either gear is quite long, as compared with the length of the gear teeth. To generate these gears by any standard method of generating bevel gears, the gears would have to be rolled during the generating process about the axis of a basic crown gear or other basic gear whose axis passes through the cone apex 25. Hence, by any ordinary method of generating bevel gears, a machine of very large size, as compared with the size of the gears themselves, would be required.

Figure 2:
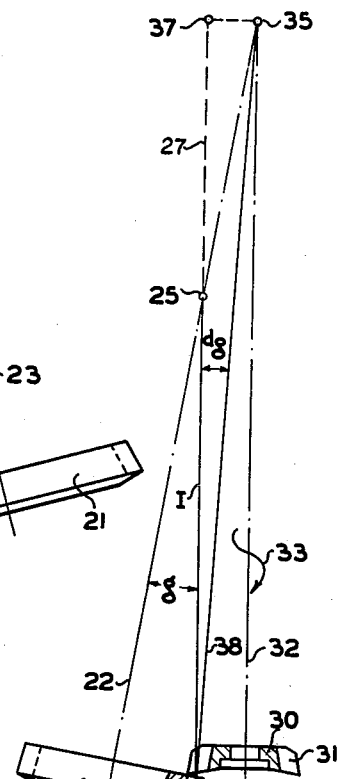
Figs. 2 and 3 are diagrammatic views showing, respectively, the cutting of the two members of the bevel gear pair and illustrating certain principles underlying the present invention.
Figure 3:
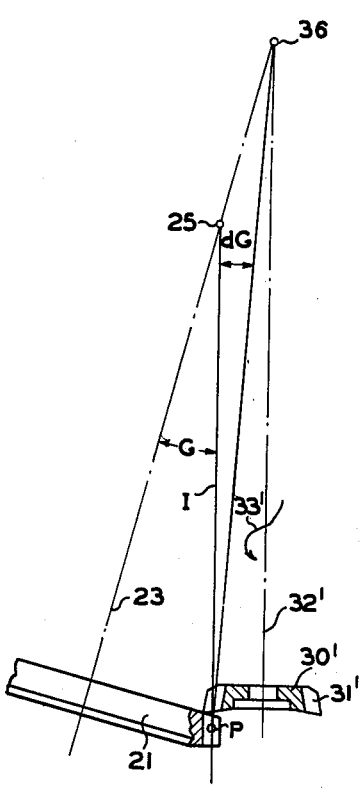

In accordance with the present invention, both gears 20 and 21 may be generated with cutters which are of gear shape and which have a plurality of cutting teeth uniformly spaced angularly about their axes. Such cutters are well known and are used extensively in the cutting of spur and helical gears. They may have their front faces dished, as shown in Figs. 2 and 3, and the sides of their teeth relieved back of their front faces, to provide sharp cutting edges. One of these cutters is shown in further detail at T in Fig. 14.

In accordance with one embodiment of the present invention, the gear 20 is generated with a gear-shaped cutter 30 whose axis 32 is parallel to the instantaneous axis I of mesh of the gears and intersects the gear axis 22 in a point 35 beyond the cone apex 25. The cutter is reciprocated along its axis in a straight path when the cutter has straight teeth, but if a cutter having helical teeth is employed, then the cutter is reciprocated in a helical path about its axis, as indicated by the arrow 33, the direction of which corresponds to the direction required for a pinion 20 having right-hand teeth. Usually, it is preferred to use a helical tool.

In this embodiment of the invention, the gear 21 is produced in a similar manner, as shown in Fig. 3. If cutters of helical form are employed, then a cutter 30' is used in cutting gear 21 which is of opposite hand from the hand of the cutter 30 and is reciprocated in the opposite helical direction as indicated by the arrow 33'. Preferably, the cutter 30' has the same number of teeth as the cutter 30. Its axis 32' is again positioned parallel to the instantaneous axis I and intersects the gear axis 23 in a point 36 beyond the cone apex 25.

Both members 20 and 21 of the gear pair are generated. As the cutter reciprocates across the face of either gear, the cutter and gear are rotated about their respective axes to effect the generating motion. In its straight or helical reciprocating motion, the cutter describes a straight spur gear or a helical gear, respectively, and the cutting motion combined with the generating rotation of cutter and work, causes the cutter to produce a gear 20 or 21 conjugate to the spur or helical gear described by the cutter.

The tooth shapes produced on the gears will now be analyzed. The spur or helical gear described by the cutter 30 meshes with the work 20 in the manner of two meshing bevel gears inasmuch as the two axes 32 and 22 intersect at 35. When their pitch surfaces roll without sliding at mean point P, then the straight line P—35 is the instantaneous axis of relative motion of the gear 20 being cut and the cylindrical gear described by the cutter. The surface of action of this mesh contains the instantaneous axis P—35, and at all points of this instantaneous axis is tangent to the tooth normal of the given spur or helical gear erected in the position of contact at said points. Moreover, if the cutter is so constructed as to describe an involute spur or helical gear, this surface contains all tooth normals which are tangent to the base cylinder of said gear and include a given constant angle with the direction of the gear axis. The instantaneous axis P—35 of generation includes a small angle $(-dg)$ with the instantaneous axis P—25 of mesh.

Let $A$=the distance P—25, and let $R_P$ and $r$ denote, respectively, the pitch radii of the pinion 20 and the cutter 30 at mean point P, that is, the distances of point P from the axes 22 and 32, respectively, of pinion and cutter. Then:

$$\tan(-dg) = \frac{\text{distance } 35\text{—}37}{\text{distance } P\text{—}37} = \frac{r}{A + \frac{r}{\tan g}} = \frac{r \cdot \tan g}{A \cdot \tan g + r}$$

Likewise on the gear 21:

$$\tan(-dG) = \frac{r \cdot \tan G}{A \cdot \tan G + r}$$

In this last equation, $r$ refers to the gear described by cutter 30'.

Figure 4:
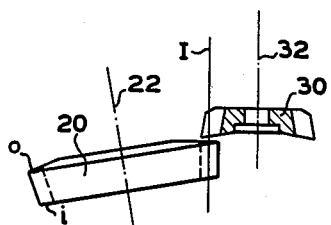
Fig. 4 is a diagrammatic view showing that it is possible with the present invention to cut the gears with a cutting stroke from the large to the small end of the gear teeth as well as with a cutting stroke from the small to the large end of the teeth.

Figs. 2 and 3 show the cutters cutting the teeth of the work on cutting strokes which extend from the small or inner end of the teeth to the outer or larger end thereof. It is also possible with the present invention to cut the teeth from the large or outer end thereof to the small or inner end thereof. This is illustrated in Fig. 4 where the same cutter 30 may be employed as in Fig. 2 to cut the pinion 20, but where the cutter operates from the outer or large end $o$ of the pinion teeth toward the inner or smaller end $i$ of the teeth. The same relationships and formulas exist in either case.

Figure 5:
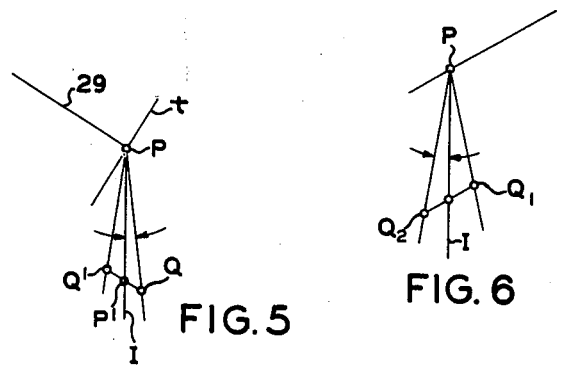
Fig. 5 is a diagrammatic view taken in the common pitch plane of the mating gears, and illustrating certain relationships between the gears.

Fig. 5 is a view of the pitch plane of mesh of the gears, that is, of the plane containing the instantaneous axis I and tangent to the pitch surfaces of the two gears. This plane is perpendicular to the drawing plane of Fig. 2 and in Fig. 5 is viewed from the right of Fig. 2. A point P' is considered along the instantaneous axis 38 of cut, which is displaced from the mean contact point P. This point P' projects to the pitch plane 27 as a point P''. Both of these points project into the same point P' in Fig. 5. Let distance P—P'' be an infinitesimal distance $dA$. The distance P'—P'' of point P' from the pitch plane is then:

$$dA \cdot \tan(-dg)$$

P'' being that much below the plane of Fig. 5.

For further analysis, helical teeth will be considered since helical teeth are mathematically a more general form of tooth. The formulas for straight teeth can be obtained from the formulas for helical teeth simply by making the helix angle $s$ equal zero. The tooth tangent $t$ at point P is inclined at the helix angle or spiral angle $s$ to the instantaneous axis I (Fig. 5). 29 indicates the tooth normal at point P. Inasmuch as the point P' is assumed at an infinitesimal distance from point P, the direction of the tooth normal at point P' differs only infinitesimally from the direction of the tooth normal at point P. The tooth normal at point P' intersects the pitch plane at a point Q for one side of the teeth and at a point Q' on the other side of the teeth.

The pressure angle $p$ at point P is the inclination of the tooth normal to the pitch plane and is preferably made numerically equal on both sides of the teeth. For one side of a tooth, it will be considered as a positive quantity, however, and for the opposite side as a negative quantity, indicating the opposite directions of inclination of the opposite sides of the teeth. The inclination of the normal P'—Q will hereinafter be considered as a positive quantity and the inclination of the normal P'—Q' as a negative quantity. Distances P'—Q and P'—Q', as projected in Fig. 5, are then:

$$\frac{P'P''}{\tan p} = dA \frac{\tan(-dg)}{\tan p} = \frac{dA}{\tan p} \cdot \frac{r \tan g}{A \tan g + r}$$

Q and Q' are points of mesh of the tool with the gear being cut during generation of the teeth of the gear.

The tooth normal at Q is inclined to the direction of the tooth normal at P as if turned about the cutter axis 32 through an angle defined by the distance of Q from instantaneous axis I on a circle of radius $r$. This angle $dp_c$ in radian measure amounts to:

$$dp_c = \frac{\text{distance } P'Q \cdot \cos s}{r} = \frac{dA \cdot \cos s}{\tan p} \cdot \frac{\tan g}{(A \tan g + r)}$$

Point Q of the pinion will mesh with the gear 21 in a different position from its point of mesh with the generating gear represented by cutter 30, namely, when turned back about the pinion axis 22 to the instantaneous axis I. The turning angle about the pinion axis is then:

$$\frac{\text{distance } P'Q \cdot \cos s}{R_p} = \frac{r}{R_p} \cdot dp_c$$

This infinitesimal turning motion about the pinion axis can be resolved into a component about an axis perpendicular to the pitch plane:

$$\frac{r}{R_p} \cdot \sin g \cdot dp_c$$

and into a component $dp'_c$ about the instantaneous axis I:

$$dp'_c = \frac{r}{R_p} \cdot \cos g \cdot dp_c$$

Inasmuch as the instantaneous axis I and the cutter axis 32 are parallel, the effect of the latter component adds directly to $dp_c$, and since:

$$\frac{R_p}{\cos g} = A \cdot \tan g$$

we have:

$$dp'_c = dp_c \cdot \frac{r}{A \tan g}$$

The resultant angle $dp''$ amounts, therefore, to:

$$dp'' = dp_c \left[ 1 + \frac{r}{A \tan g} \right] = \frac{dA \cdot \cos s}{\tan p} \cdot \frac{\tan g}{(A \tan g + r)} \cdot \frac{(A \tan g + r)}{A \tan g} = \frac{dA}{A} \cdot \frac{\cos s}{\tan p}$$

Since:

$$\frac{R_p}{\sin g} = A$$

the other component amounts to:

$$ds = \frac{r}{A} \cdot dp_c = \frac{dA}{A} \cdot \frac{\cos s}{\tan p} \cdot \frac{r \tan g}{(A \tan g + r)}$$

This is a change of the direction of the tooth normal in the view of the pitch plane (Fig. 5).

The turning angle $dp''$ about the instantaneous axis or about an axis parallel thereto also affects this direction. In the view looking at the pitch plane, it gives an increase in spiral angle of:

$$ds' = dp'' \cdot \sin s \tan p$$

inasmuch as the infinitesimal turning motion $dp''$ about the instantaneous axis I can be resolved into a turning motion about the tooth tangent $t$ (Fig. 5) and into a turning motion:

$$dp'' \cdot \sin s$$

about normal 29 in the pitch plane. Only the latter component affects the direction of the tooth normal in the view of the pitch plane and produces the above change $ds'$.

The resultant change of direction $ds''$ in the pitch plane view, therefore, amount to:

$$ds'' = ds + ds'$$
$$= \frac{dA}{A} \cdot \frac{\cos s}{\tan p} \left[ \frac{r \tan g}{A \tan g + r} + \sin s \cdot \tan p \right]$$

The considered point Q has a distance $dA'$ lengthwise of instantaneous axis I as follows:

$$dA' = dA + \text{distance } P'Q \cdot \sin s =$$

$$dA \left[ 1 + \frac{\sin s}{\tan p} \cdot \frac{r \tan g}{A \tan g + r} \right]$$

Hence, also:

$$ds'' = \frac{dA'}{A} \cdot \frac{\cos s}{\tan p \left[ 1 + \frac{\sin s}{\tan p} \cdot \frac{r \tan g}{(A \tan g + r)} \right]} \left[ \frac{r \tan g}{A \tan g + r} + \sin s \cdot \tan p \right]$$

This equation is also applicable to the opposite side of the teeth when pressure angle $p$ is introduced there as a negative quantity.

Figure 6:
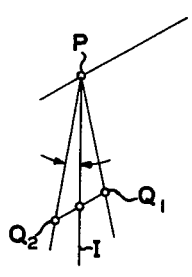
Fig. 6 is a similar diagrammatic view showing the lines of mesh of one of the gears in the pitch plane.
Figure 7:
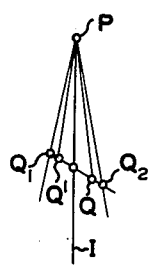
Fig. 7 is a similar diagrammatic view showing the lines of mesh of both gears in the pitch plane.

Fig. 6 shows the pitch plane and the lines of mesh P—$Q_1$ and P—$Q_2$ of the gear 21 in that plane with the cylindrical gear represented by tool 30'. Fig. 7 is a further view of the pitch plane with the pinion 20 assumed below the pitch plane and the gear 22 above it in mesh with the pinion 20. The lines of mesh along which contact takes place between each of the two members 20 and 21 and the respective cylindrical gears represented by the reciprocating cutters 30 and 30' are here superimposed. Line PQ is the line of mesh of the pinion 20 and its generating gear as above explained on one side of the teeth. Line $PQ_1$ is the corresponding line of mesh on the same side of the teeth between the gear 21 and its generating gear. On this side the pressure angle $p$ is introduced as a positive quantity into the gear formulas given below.

With the procedure outlined for the pinion, the following equation may be derived for the gear 21:

$$ds_1'' = \frac{dA' \cos s}{A \tan p \left[1 - \frac{\sin s}{\tan p} \cdot \frac{r \tan G}{(A \tan G + r)}\right]} \left[\sin s \cdot \tan p - \frac{r \tan G}{(A \tan G + r)}\right]$$

The difference $(ds'' - ds_1'')$ will be used to determine the ease-off of the tooth bearing at the ends of mating teeth:

$$(ds'' - ds_1'') = \frac{dA' \cos s}{A \tan p \left[1 + \frac{\sin s}{\tan p} \cdot \frac{r \tan g}{(A \tan g + r)}\right]\left[1 - \frac{\sin s}{\tan p} \cdot \frac{r \tan G}{(A \tan G + r)}\right]} \cdot$$

$$\left[\frac{r \tan g}{(A \tan g + r)}\left\{1 - \frac{\sin s}{\tan p} \cdot \frac{r \tan G}{(A \tan G + r)}\right\} + \frac{r \tan G}{(A \tan G + r)}\left\{1 + \frac{\sin s}{\tan p} \cdot \frac{r \tan g}{(A \tan g + r)}\right\} + \right.$$

$$\left. \sin s \cdot \tan p \left\{1 - \frac{\sin s}{\tan p} \cdot \frac{r \tan G}{(A \tan G + r)}\right\} - \sin s \cdot \tan p \left\{1 + \frac{\sin s}{\tan p} \cdot \frac{r \tan g}{(A \tan g + r)}\right\}\right]$$

The quantity in the bracket in the above formula can be written as:

$$\left[\frac{r \tan g}{(A \tan g + r)} \cdot (1 - \sin^2 s) + \frac{r \tan G}{(A \tan G + r)} \cdot (1 - \sin^2 s)\right] = \frac{\cos^2 s}{A}\left[\frac{1}{\frac{1}{r} + \frac{1}{A \tan g}} + \frac{1}{\frac{1}{r} + \frac{1}{A \tan G}}\right]$$

Let D denote the infinitesimal distance of the considered pitch point Q from the mean pitch point P measured in the direction of the tooth tangent so that:

$$dA' = D \cdot \cos s$$

At a point, which is a distance D away from the pitch point P, there is a difference $$(ds'' - ds_1'')$$

in spiral angle of the mating tooth sides. This difference is in a direction to produce ease-off of the tooth bearing at the tooth ends on both sides of the teeth and corresponds to a relative curvature $$\frac{1}{r'}$$

of the pitch lines:

$$\frac{1}{r'} = \frac{(ds'' - ds_1'')}{D}$$

and $$D = \frac{dA'}{\cos s}$$

hence:

$$\frac{1}{r'} = \left(\frac{\cos^2 s}{A}\right)^2 \cdot \frac{1}{\tan p} \cdot \frac{\left[\frac{1}{\frac{1}{r} + \frac{1}{A \tan g}} + \frac{1}{\frac{1}{r} + \frac{1}{A \tan G}}\right]}{\left[1 + \frac{\sin s}{\tan p} \cdot \frac{r \tan g}{A \tan g + r}\right]\left[1 - \frac{\sin s}{\tan p} \cdot \frac{r \tan G}{(A \tan G + r)}\right]}$$

It is to be observed that in the factors below the division line in the last equation the second members are small quantities as compared with the first member which equals unity. This is partly due to the presence of tangent $g$ or tangent $G$ which are small quantities at the small shaft angles between the mating gears considered. Moreover, the second members have opposite algebraic signs. The product of the two factors differs, therefore, very little from unity and a good and sufficient approximation of the relative curvature $$\frac{1}{r'}$$

is obtained by neglecting its slight difference from unity.

The ease-off Z at the tooth ends of the pitch lines can thus be computed approximately for gears of a face width F as follows:

$$Z = \frac{1}{2r'} \cdot \left(\frac{F}{2 \cos s}\right)^2$$

$$Z = \frac{1}{8 \tan p}\left(\frac{F \cos s}{A}\right)^2 \left[\frac{1}{\frac{1}{r} + \frac{1}{A \tan g}} + \frac{1}{\frac{1}{r} + \frac{1}{A \tan G}}\right]$$

Z is the separation of the mating pitch lines at the tooth ends. It is measured in opposite directions on the two sides of the teeth as indicated by the algebraic sign and amounts to an ease-off on both sides of the teeth.

The formula indicates that the ease-off is reduced by introducing a spiral angle $s$, increasingly so with increasing spiral angle.

Gears produced according to the present invention are far less subject to undercut at the small ends of the teeth and to pointed tooth tops at the large end than are gears of pairs composed of a cylindrical gear and a tapered gear which mesh at the same shaft angle as gears made according to the present invention. Moreover, the gears of the present invention have localized tooth bearing. Furthermore, standard cutters can be employed in cutting gears according to the present invention, whereas on ratios of nearly 1 to 1 and, more generally, with large sized pinions, an unduly large cutter has to be employed where the cutter corresponds to the mating pinion. Also, with the present invention, there is less profile sliding at the ends of the teeth inasmuch as the teeth extend in the general direction of the instantaneous axis.

To use standard cutter diameters, it is, of course, necessary that a standard pitch be used in the gear design at mean point P. If $P_d$ denotes a standard diametral pitch, the mean gear diameters ($2R_p = 2A \sin g$) and $2R = 2A \sin G$ and the tooth numbers $n$ and $N$, respectively of the gears should fulfill the equations:

$$2R_p = \frac{n}{P_d}$$

and $$2R = \frac{N}{P_d}$$

where $R_p$ and $R$ are the pitch radii of mating pinion and gear, respectively.

In the embodiment of the invention just described, control over the amount of ease-off of the tooth bearing at the tooth ends is limited. A modification of the invention will now be described through which the ease-off of the bearing at the tooth ends is under more complete control. This modification is illustrated in Figs. 8 to 14 inclusive.

Figure 9:
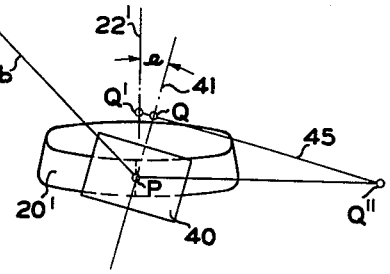

Here the axis of the cutter and the axis of the work are no longer in the same plane. The cutter has its axis 41 inclined to and offset from the axis 22' of the pinion or gear 20' being cut. As the cutter reciprocates, it describes a cylindrical gear 40 whose axis 41 is inclined to the pitch cone element extending through mean point P of gear 20' and whose cylindrical surface is tangent at P to the conical pitch surface of the gear 20'. The inclination of the cutter axis is denoted as $e$ (Fig. 9). To obtain gear contact at point P, the normal displacement along the tooth normal $b$ at point P should be equal on gear 20' and the gear 40 upon corresponding rotation of the gears.

The peripheral displacement per rotation through a tooth is:

$$2\pi \cdot \frac{A \sin g}{n}$$

on gear 20' and:

$$2\pi \cdot \frac{r}{n'}$$

on the gear 40 represented by the cutter, where $n'$ represents the number of teeth in gear 40 or the cutter. The corresponding normal displacement is a product of the above displacement multiplied by the cosine of the respective spiral angles. Let $s_c$ denote the spiral angle or helix angle of the gear 40 represented by the cutter. The spiral angle $s$ at point P of the gear 20' is then:

$$(s_c + e)$$

with the inclinations shown in Fig. 9. $e$ could also be negative.
Hence:

$$2 \cdot \frac{A \sin g}{n} \cdot \cos(s_c + e) = 2 \frac{r}{n'} \cdot \cos s_c$$

$$\frac{A \sin g}{n} = \frac{A \sin G}{N} = \frac{r}{n'} \cdot \frac{\cos s_c}{\cos(s_c + e)}$$

This equation simply expresses the requirement that the normal circular pitch should be the same on the cutter and on both members of the bevel gear pair to be produced.

In cutting a gear according to this second embodiment of the invention, the same motions may be employed as in the first described modification of the invention. The only difference is that in the second embodiment the cutter axis is offset from the work axis. The cutter is reciprocated along its axis 41. It performs a straight or helical reciprocation, depending upon whether it should describe in its path a cylindrical gear with straight teeth or one with helical teeth. In addition, a generating motion is provided which consists of rotation of the cutter on its axis and of the work on its axis. These generating motions are very slow and may be intermittent after each cutting stroke. They are as if the cylindrical gear represented by the reciprocating cutter were meshing with the gear which is being produced. It should be noted that no lateral feed motion is employed and that therefore the gear produced is directly and fully conjugate to the cylindrical gear represented by the tool. It can mesh with line contact with said gear.

At the end of each cutting stroke, the tool and work are, of course, separated slightly so that the tool clears the work during the return stroke.

Figure 8:
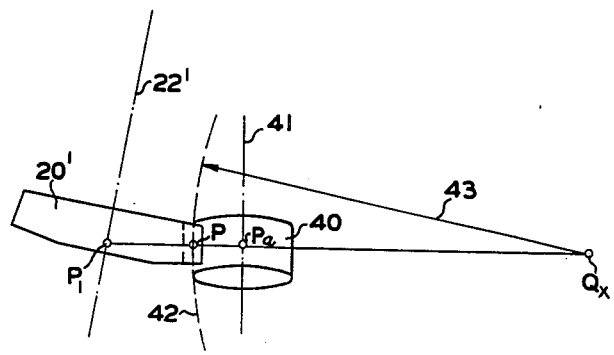
Figs. 8 and 9 are diagrammatic views at right angles to one another, illustrating a modification of the invention.

The cylindrical pitch surface of the gear 40 represented by the cutter, shown in Figs. 8 and 9, contacts the conical pitch surface of the bevel gear 20' at point P only and is separated therefrom at all other points. When rotated bodily about the pinion axis 22' this cylindrical pitch surface envelops and describes a surface of revolution of concave axial shape. The profile of this surface is shown in dotted lines in Fig. 8 at 42. Its radius of curvature at point P is denoted at 43 in Fig. 3 and its center at $Q_x$. The separation of this profile 42 from its tangent at P indicates the amount by which the cutter will cut shallower at the point considered as compared with a cutter whose axis intersects the axis of the work. The latter cutter produces an ease-off Z at the tooth ends as previously determined which may be in excess of the desired ease-off Z'. The ease-off Z should, therefore, be reduced by a (Z—Z'). This may require cutting shallow at the tooth ends of a total of:

$$\frac{Z - Z'}{\tan p}$$

on both members of the pair. In other words, we could aim at a total curvature $$\frac{1}{r_x}$$

which gives this separation at the tooth ends or:

$$\frac{1}{2} \frac{F^2}{2} \frac{1}{r_x} = \frac{Z - Z'}{\tan p}$$

$$\frac{1}{r_x} = \frac{8(Z - Z')}{F^2 \tan p}$$

Curvature radius $r_x$ depends largely on the inclination $e$. For its determination, the normal at a point of contact at an infinitesimal distance from P will be considered. The normal at any point of contact between the cylindrical pitch surface 40 and the surface of revolution enveloped thereby passes through both axes 41 and 22' and is perpendicular to axis 41. Thus, normal 45 in Fig. 9 is perpendicular to axis 41 and intersects it at Q; and it intersects axis 22' at Q'. It intersects the plane PQ'' at point Q''. This plane contains the pitch surface normal P—P1 (Fig. 8) and is perpendicular to the axial gear plane containing point P. The center of curvature $Q_x$ of the dotted axial profile 42 is attained by turning normal 45 and its point Q'' about the gear axis into the axial plane from Q'' to $Q_x$ on the pitch surface normal. In this turning motion, point Q'' moves in a direction parallel to the drawing plane of Fig. 9, as long as infinitesimal distances PQ are considered. The distance $PQ_x$ (Fig. 8) is therefore equal to the vertical elevation (Fig. 9) of point Q'' from P.

In the projection of Fig. 9:

$$Q'Q = PQ \cdot \tan e$$

$$QQ'' = PQ \cdot \operatorname{ctn} e$$

$$\frac{Q'Q}{QQ''} = \tan^2 e$$

From Fig. 8:

$$\frac{P_1 P_a}{P_a Q_x} = \frac{Q'Q}{QQ''} = \tan^2 e$$

$$P_1 P_a = P_1 P + P P_a = A \tan g + r$$

$$P_a Q_x = P Q_x - P P_a = r_x - r$$

Hence on the gear 20':

$$r_x - r = \frac{A \tan g + r}{\tan^2 e}$$

$$r_x = \frac{A \cdot \tan g + r(1 + \tan^2 e)}{\tan^2 e} = \frac{A \tan g \cdot \cos^2 e + r}{\sin^2 e}$$

$$\frac{1}{r_x} = \frac{\tan^2 e}{A \tan g + r(1 + \tan^2 e)} = \frac{\sin^2 e}{A \tan g \cdot \cos^2 e + r}$$

$$\frac{1}{r_x} < \frac{\tan^2 e}{A \tan g + r}$$

$$\frac{1}{r_x} > \frac{\sin^2 e}{A \tan g + r}$$

On the mating gear 21, pitch angle G is used instead of g, and:

$$\sum \frac{1}{r_x} = \frac{\sin^2 e}{A \tan g \cdot \cos^2 e + r} + \frac{\sin^2 e}{A \tan G \cdot \cos^2 e + r}$$

gives the total curvature of the axial profiles of the mating gears when the same angular settings e and the same cutter radius r is used on both gears.

$$\sum \frac{1}{r_x}$$

is found to be intermediate the values:

$$\sin^2 e \left[ \frac{1}{A \tan g + r} + \frac{1}{A \tan G + r} \right]$$

and:

$$\tan^2 e \left[ \frac{1}{A \tan g + r} + \frac{1}{A \tan G + r} \right]$$

and may be assumed approximately equal to the latter value.
Thus:

$$\tan^2 e \left[ \frac{1}{A \tan g + r} + \frac{1}{A \tan G + r} \right] = \frac{8(Z - Z')}{F^2 \tan p}$$

An initial tan e and e may be determined from this equation.

Figures 10, 11:
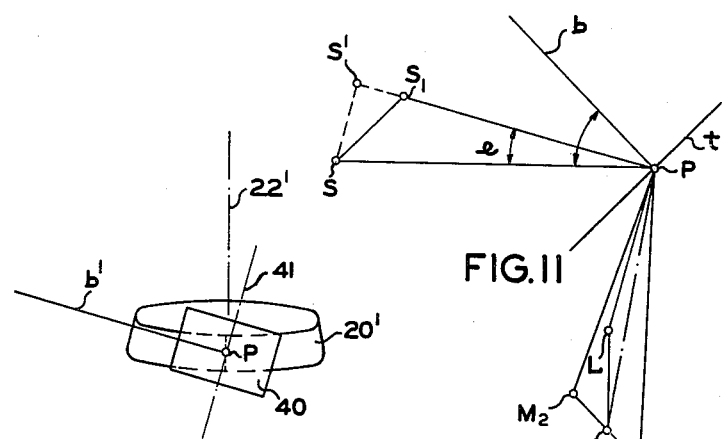
Fig. 10 is a diagrammatic view, similar to Fig. 9, illustrating a further modification of the invention.
Figs. 11 and 12 are diagrammatic views taken in the same directions as Figs. 9 and 8, respectively, and illustrating certain relationships underlying the invention.
Figure 12:
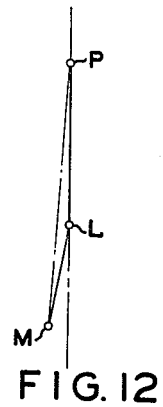
Figure 13:
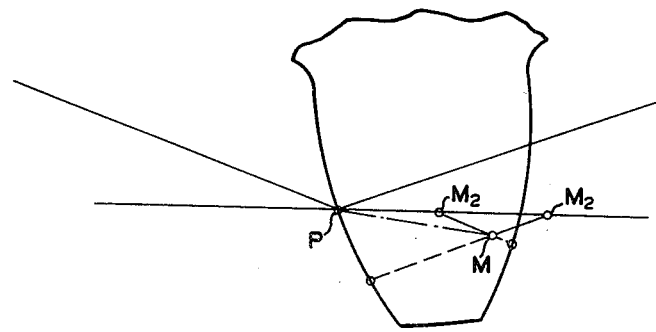
Fig. 13 is an enlarged diagrammatic view, showing one of the gear teeth, and taken along the tangent to the tooth shown in Fig. 11.

It is possible, also, to make an exact determination of the ease-off obtained with a given angular setting e and cutter radius r. First, the surface of action during generation of each gear is determined, that is, its tangent plane at mean point P. In Fig. 11, the tooth tangent t at point P shows the tooth direction. b is the tooth normal at P. In the mesh between the gear 20' and the gear 40 represented by the cutter, point P of the gear 20' moves in a peripheral direction PS; and point P of the gear 40 represented by the cutter in the peripheral direction P—$S_1$ which includes the angle e with the direction PS. PS and $PS_1$ represent the corresponding distances traveled. As seen, the end positions S and $S_1$ are on a line S—$S_1$ parallel to the tooth tangent or pitch line tangent t.

Inasmuch as the gear 40, which is represented by the cutter, may contain either straight or helical teeth, it can be moved axially without altering the mesh and the surface of action. Thus, the gear 40 of Fig. 9 may be given a helical motion lengthwise of the teeth to move point $S_1$ to S so that, in the resultant motion, point P of the gear 40 moves to S instead of moving to $S_1$. The additional motion is made up of a turning motion $S_1$—S' and of an axial motion S'—S. The resulting or total turning motion of the helical gear 40 represented by the tool then compares with its turning motion without axial displacement as distance PS' compares with the distance $PS_1$.

Let $w_1$ denote the resultant angular velocity of the helical gear about its axis 41, and let $w'$ and $w''$ denote, respectively, the angular velocities about the axis 22' and about the axis of the basic gear employed in generation of the gear which is to mate with gear 20'. Distances PS and PS' can then represent the velocities at pitch point P as follows:

$$PS = w' A \sin g = w'' A \sin G$$
$$PS' = w' r = w' A \sin g \cdot \cos e$$

Hence:

$$w_c = w' \frac{A \sin g}{r} \cdot \cos e$$

Inasmuch as with the added helical motion, point P of the helical gear moves in the same direction and at the same rate PS as point P of the gear 20', the relative motion can only be a turning motion about an instantaneous axis passing through P, and true rolling motion takes place at P. The instantaneous axis of this rolling motion can be obtained in known manner as follows. The individual angular velocities $w'$ and $w_1$ are geometrically added to give the resultant relative angular velocity about the instantaneous axis in the direction of the instantaneous axis. Thus, angular velocity $w_1$ can be plotted as a distance PL in Figs. 11 and 12 drawn through P parallel to axis 41. Angular velocity $w'$ is then plotted at the same scale as a distance LM on a line drawn through L, parallel to axis 22' of gear 20'. Distance PM then determines the resultant relative angular velocity, and the line PM is the instantaneous axis. The surface of action contains the instantaneous axis and it either contains or is tangent to the tooth normal at P. Its tangent plane at P is, therefore, the plane connecting the instantaneous axis and the tooth normal at P.

There is a surface of action for each of the two sides of the teeth. Its tangent plane intersects the pitch plane, which is plane $PSS_1$ in a line $PM_1$ on one side of the gear teeth, and in a line $PM_2$ on the other side. $M_1$ and $M_2$ are obtained by drawing lines $MM_1$ and $MM_2$ through $M$ parallel to the two tooth surface normals at $P$, and by determining their intersection $M_1M_2$ with the pitch plane. Lines $PM_1$ and $PM_2$ represent the tangents at $P$ to the lines of mesh in the pitch plane between the gear 20' and the generating gear 40 represented by the tool. After these are determined for both tapered gears, the following equations may be derived by employing the principles previously disclosed:

$$C_1 = \frac{\sin s_c \cdot \cos s_c - \sin e \cdot \cos e}{r}$$

$$C_2 = \frac{\sin s \cdot \cos s}{A}$$

$$C_3 = \frac{(\sin e \cdot \tan p)^2}{r}$$

$$\frac{ds''}{dA'} = \frac{C_1 + \dfrac{C_2}{\tan g} - \dfrac{\cos s}{\tan p}\left\{\dfrac{C_3}{\tan g} - \dfrac{1}{A}\right\}}{\operatorname{ctn} g + \dfrac{A}{r} \cdot \cos^2 e + \dfrac{\sin s}{\tan p}}$$

$$\frac{ds_1''}{dA'} = \frac{C_1 + \dfrac{C_2}{\tan G} + \dfrac{\cos s}{\tan p}\left\{\dfrac{C_3}{\tan g} - \dfrac{1}{A}\right\}}{\operatorname{ctn} G + \dfrac{A}{r} \cdot \cos^2 e - \dfrac{\sin s}{\tan p}}$$

$$Z = \frac{F^2}{8 \cos s}\left(\frac{ds''}{dA'} - \frac{ds_1''}{dA'}\right)$$

In these formulas, the pressure angle $p$ should be introduced as a positive quantity on one side of the teeth and as a negative quantity on the opposite side. Mating tooth sides correspond to pressure angles of the same algebraic sign.

A positive quantity $Z$ indicates a separation or ease-off on the side where the pressure angle $p$ is positive. On the opposite side, where $p$ is negative, $Z$ appears negative if an ease-off. An algebraic sign opposite to the one indicated would show that the teeth have too much stock at their ends, that is, a negative ease-off, which, of course, should be avoided. To obtain more ease-off, $e$ should be reduced. Less ease-off is attained by increasing $e$.

Preferably cutters of equal pitch diameter are used on both members of the tapered gear pair. Preferably, also, the lead of the gear described by the cutter is selected equal in producing the two tapered gears. The hand, of course, is opposite.

In this second described embodiment of the invention it is possible to obtain a spiral angle on the gear teeth with the cutter having straight teeth which represents a spur gear. This modification is indicated in Fig. 10 where the tooth normal $b'$ is shown perpendicular to the cutter axis 41. Here the cutter represents a basic generating gear 40' which has straight, spur teeth. The cutting and generating motions are as in the previously described embodiments of the invention.

While the invention has been described in connection with the production of tapered gears which have their axes intersecting, it is to be understood that it is applicable, also, to the production of tapered gears having offset axes.

Figure 14:
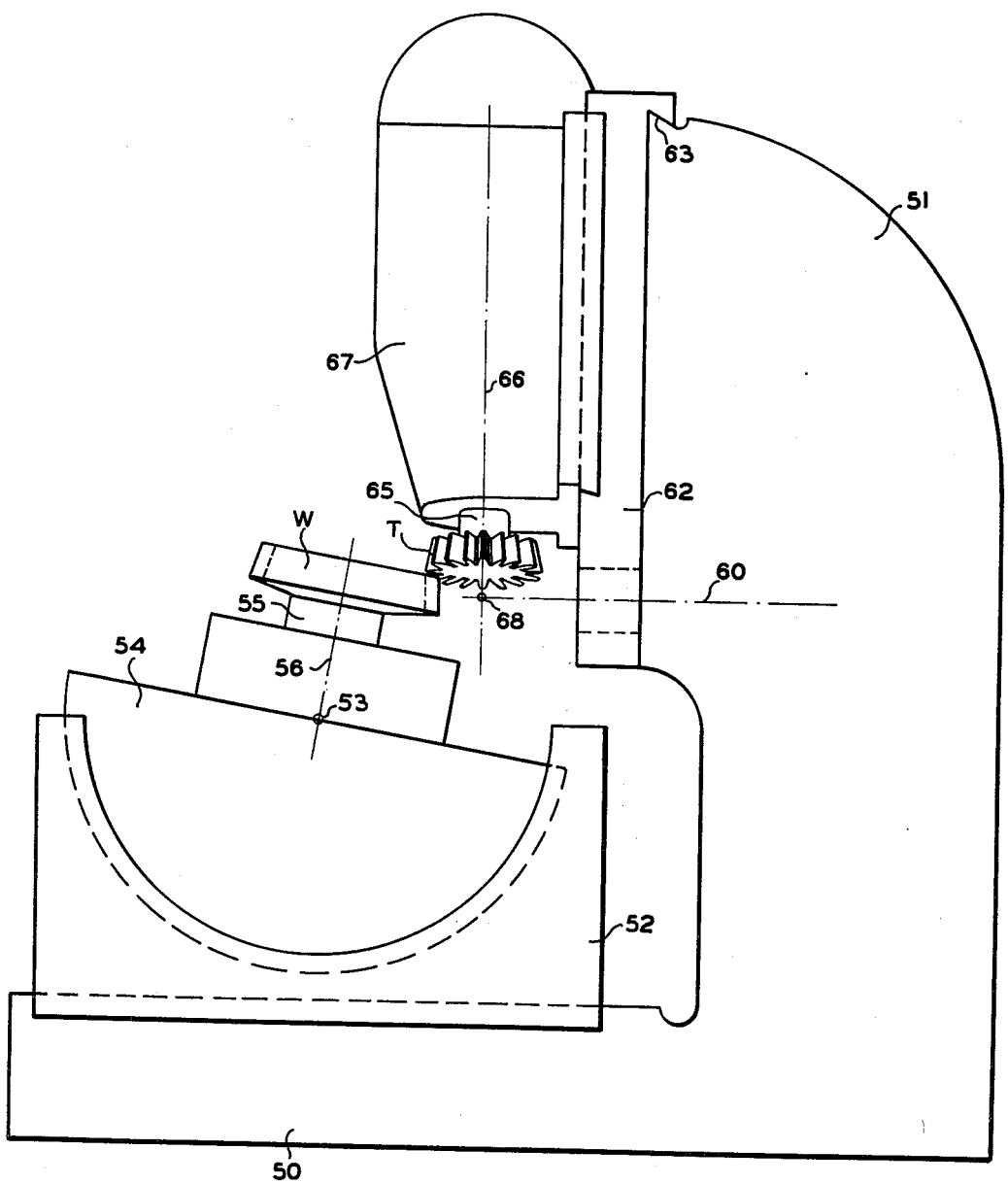
Fig. 14 is a diagrammatic view showing a tapered gear cutting machine built according to one embodiment of this invention.

In Fig. 14, I have illustrated diagrammatically one form of a machine which may be employed for practicing the present invention. Here 50 denotes the base or frame of the machine and 51 an upright or column that is secured to the base and, which in fact, may be made integral therewith. Mounted upon the base 50 for rectilinear adjustment thereon, is a table or slide 52, and mounted in the table or slide 52 for angular adjustment therein about an axis 53 is a cradle 54. The work spindle 55 of the machine is journaled in the cradle, and the gear W, which is to be cut, is secured to the work spindle in any suitable manner. The axis of the work spindle, which is the axis of the gear, is denoted at 56.

Pivotally mounted upon the column 51 for angular adjustment thereon about an axis 60 is a swingable support 62. This support is guided in its angular adjustment by an arcuate guide surface 63 which is formed on the top of column 51 and which engages a complementary surface on the swingable support 62. The cutting tool T is secured to the cutter spindle 65 which is journaled in the cutter head 67 that is mounted on the support 62 for rectilinear adjustment thereon. The axis of the cutter spindle is denoted at 66. It intersects axis 60 in point 68. The head 67 is adjustable on the support 62 in the direction of the cutter axis 66.

The means for rotating the cutter and for effecting its reciprocating axial motion, and the means for relieving the cutter at the ends of its cutting strokes may be the same as employed in conventional type machines for cutting spur and helical gears. The train of gearing for timing the rotary motion of the cutter and of the work about their respective axes 66 and 56 may be similar to the gear train employed in conventional type spur and helical gear cutting machines. Preferably, however, the timing train will contain a gear coaxial with cradle axis 53 and a gear coaxial with axis 60.

After resharpening, a conventional gear-shaped cutter decreases in its diameter. An adjustment of its position is then required principally in a direction to move the work and cutter relatively toward one another, that is, in the direction of the axis 60 (Fig. 14). This is accomplished by adjusting the slide 52 on the base 50. Other required compensatory readjustments are about the cradle axis 53 to slightly change the tilt of the work axis 56 and about axis 60. The amount of this last named readjustment is slight but important and depends on the helix angle of the generating gear represented by the cutter. The nature and amount of the required adjustment is readily determined on the testing machine by testing a gear cut with a particular setting against a master gear or with its mate. The adjustments provided on the machine of the present invention are also useful for other cutting changes as, for instance, for modifying the tooth shape to allow for anticipated distortions in the hardening.

Instead of an angular adjustment about axis 60, a lateral adjustment between the axes 66 and 56 may be provided, that is, an adjustment in a direction perpendicular to the drawing plane of Fig. 14 to offset these axes from one another. This linear adjustment then takes the place of the angular adjustment about pivot 60 which also offsets the two axes. The same relative position of the two axes may be arrived at with either construction.

While the invention has been described particularly in connection with the cutting of tapered gears of small shaft angle with cutters of cylindrical gear form, it may also be applied to the production of tapered gears with cylindrical hobs. Preferably, hobs will be used whose threads have involute, helical sides. The axis of the hob is inclined in the opposite direction to the axis 14 of Fig. 9 so that angle $e$ is negative. If $l$ denotes the lead angle of the hob, that is, $90°-s$, the spiral angle of the gear teeth produced will be:

$$s = 90° - l + e$$

and, if $e'$ is equal to $-e$, that is, if the tilt angle is opposite, from that shown, then:

$$s = 90° - l - e'$$

$e'$ is preferably kept larger than 30°.

These formulas apply also to hobbing in which only depthwise feed is used, and no feed along the pitch cone element, nor any lateral feed is employed. However, if desired, helical feed along the hob axis can be used in place of depthwise feed. Such helical feed is known for hobbing worm wheels and will produce the same tooth shape as the depthwise feed when the final tooth shape is applied in the final position of feed.

While several different embodiments of the invention have been described, it is to be understood that the invention is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of producing a pair of tapered gears which comprises cutting each member of the pair with a rotary tool of cylindrical gear shape by positioning said tool in engagement with the work with the axis of the tool parallel to the instantaneous axis of mesh of the pair of gears, and with the axis of the tool intersecting the axis of the work and reciprocating the tool in engagement with a tapered gear blank while rotating the tool and blank on their respective axes as though the blank were meshing with a cylindrical gear described by the cutting edges of the reciprocating tool, and whose axis intersects the axis of the blank.

2. The method of producing a pair of tapered gears which comprises cutting each member of the pair with a rotary tool of gear shape by reciprocating the tool in engagement with a tapered gear blank while rotating the tool and blank on their respective axes as though the blank were meshing with a cylindrical gear described by the reciprocating tool and whose axis intersects the axis of the blank in a point beyond the pitch cone apex of the blank.

3. The method of producing a pair of tapered gears which comprises generating each member of the pair conjugate to a cylindrical gear other than its mate by positioning a rotary tool of cylindrical gear form in engagement with a tapered gear blank with its axis parallel to the instantaneous axis of mesh of the gear pair, and reciprocating said tool axially while rotating the tool and blank about their respective axes as though the gear being cut were meshing with a cylindrical gear described by the tool in its reciprocatory movement, the axis of the tool intersecting the axis of the work, and the tools used in cutting the two members of the pair having equal numbers of teeth.

4. The method of producing a pair of tapered gears which comprises generating each member of the pair conjugate to a cylindrical gear by axially reciprocating a rotary tool of cylindrical gear form in engagement with a gear blank while rotating the tool and blank about their respective axes as though the gear being cut were meshing with a cylindrical gear described by the tool in its reciprocating movement, the axis of the tool intersecting the axis of the work and being inclined to the axis of the work at the pitch angle of the work, and the tools used in cutting the two members of the pair having equal numbers of teeth.

5. The method of producing a pair of tapered gears which comprises generating each member of the pair conjugate to a cylindrical gear other than its mate by axially reciprocating a rotary tool of cylindrical gear form in engagement with a gear blank while rotating the tool and blank about their respective axes as though the gear being cut were meshing with a cylindrical gear described by the tool in its reciprocating movement, the axis of the tool intersecting the axis of the work, the diameters of the two tools used in cutting the two members of the tapered gear pair being different so as to provide ease-off of the tooth bearing at the ends of the teeth on mating tooth surfaces of the pair of gears.

6. The method of producing a pair of tapered gears which comprises generating each member of the pair conjugate to a cylindrical gear other than its mate by positioning a rotary tool of cylindrical gear form having helically arranged cutting teeth in engagement with a tapered gear blank so that the axis of the tool intersects the axis of the blank in a point beyond the pitch cone apex of the blank, and imparting helical reciprocating movements to the tool about and along its axis while effecting a relative generating motion between the tool and the blank as though the gear being cut were meshing with a helical gear described by the tool in its reciprocating movements, the tools used in cutting the two members of the tapered gear pair being of opposite hand and being given helical reciprocatory movements of opposite hand, and having equal numbers of teeth.

7. The method of producing a pair of tapered gears which comprises generating each member of the pair conjugate to a cylindrical gear other than its mate by positioning a rotary tool of cylindrical gear form having helically arranged cutting teeth in engagement with a tapered gear blank so that the axis of the tool intersects the axis of the blank in a point beyond the pitch cone apex of the blank, and imparting helical reciprocating movements to the tool about and along its axis while effecting a relative generating motion between the tool and blank as though the gear being cut were meshing with the helical gear described by the tool in its reciprocating movement, the tools used in cutting the two members of the tapered gear pair being of opposite hand and being given helical reciprocating movements of opposite hand, and the helix angles of the two tools being selected so as to produce a suitable amount of localization of tooth bearing on the mating tooth surfaces of the tapered gear pair when in mesh.

8. The method of producing a pair of tapered gears which comprises generating each member of the pair conjugate to a cylindrical gear other than its mate by positioning a rotary tool of cylindrical gear form having helically arranged cutting teeth in engagement with a tapered gear blank so that the axis of the tool intersects the axis of the blank in a point beyond the pitch cone apex of the blank, and imparting helical reciprocating movements to the tool about and along its axis while effecting a relative generating motion between the tool and blank as though the gear being cut were meshing with the helical gear described by the tool in its reciprocating movement, the tools used in cutting the two members of the tapered gear pair being of opposite hand and being given helical reciprocating movements of opposite hand, and the helix angles and diameters of the two tools being selected so as to produce a suitable amount of localization of tooth bearing on the mating tooth surfaces of the tapered gear pair when in mesh.

9. The method of producing a pair of tapered gears which comprises generating each member of the pair conjugate to a cylindrical gear by positioning a tool of cylindrical gear form in engagement with a tapered gear blank with the axis of the tool inclined to but offset from the axis of the blank, and imparting axial reciprocating movements to the tool while effecting a relative generating movement between the tool and blank as though the gear being cut were meshing with the cylindrical gear described by the tool in its reciprocating movements.

10. The method of producing a pair of tapered gears which comprises generating each member of the pair conjugate to a cylindrical gear by positioning a tool of cylindrical gear form in engagement with a tapered gear blank with the axis of the tool inclined to but offset from the axis of the blank, and imparting axial reciprocatory movements to the tool while effecting a relative generating movement between the tool and blank as though the gear being cut were meshing with the cylindrical gear described by the tool in its reciprocatory movement, the two tools used in cutting the two members of the gear pair having equal numbers of teeth.

11. The method of producing a pair of tapered gears which comprises generating each member of the pair conjugate to a cylindrical gear by positioning a tool of cylindrical gear form having helically arranged cutting teeth in engagement with a tapered gear blank so that the axis of the tool is inclined to but offset from the axis of the blank, and imparting helical reciprocatory movements to the tool about and along its axis while effecting a relative generating movement between the tool and blank as though the gear being cut were meshing with the helical gear described by the tool in its reciprocatory movements, the tools used in the cutting of the two members of the tapered gear pair being of opposite hand and being given helical reciprocatory movements of opposite hand.

12. The method of producing a pair of tapered gears which comprises generating each member of the pair conjugate to a cylindrical gear other than its mate by positioning a rotary tool of cylindrical gear form having helically arranged cutting teeth in engagement with a tapered gear blank so that the axis of the tool is inclined to but offset from the axis of the blank, and imparting helical reciprocatory movements to the tool about and along its axis while effecting a relative generating motion between the tool and work as though the gear being cut were meshing with the helical gear described by the tool in its reciprocatory movements, the tools used in the cutting of the two members of the tapered gear pair being of opposite hand and being given helical reciprocatory movements of opposite hand, and having equal numbers of teeth.

13. The method of producing a pair of tapered gears which comprises generating each member of the pair conjugate to a cylindrical gear other than its mate by positioning a rotary tool of cylindrical gear form in engagement with a tapered gear blank so that the axis of the tool is inclined to but offset from the axis of the blank, and imparting axial reciprocating movements to the tool while effecting a relative generating movement between the tool and blank as though the gear being cut were meshing with the cylindrical gear described by the tool in its reciprocating movement, the tools used in cutting the two members of the tapered gear pair having equal pitch diameters.

14. The method of producing a pair of tapered gears which comprises generating each member of the pair conjugate to a cylindrical gear by positioning a tool of cylindrical gear form in engagement with a tapered gear blank with the axis of the tool inclined to but offset from the axis of the blank, and imparting axial reciprocating movements to the tool while effecting a relative generating movement between the tool and blank as though the gear being cut were meshing with the cylindrical gear described by the tool in its reciprocating movements, the two tools used in generating the two members of the tapered gear pair being of equal pitch diameter and having the same normal circular pitch.

15. The method of producing a pair of tapered gears which comprises generating each member of the pair by positioning a tool of cylindrical gear form having helically arranged cutting teeth in engagement with a tapered gear blank with the axis of the tool inclined to but offset from the axis of the blank, and imparting helical reciprocatory movements to the tool about and along its axis while effecting a relative generating motion between the tool and blank as though the gear being cut were meshing with the helical gear described by the tool in its reciprocating movements, the tools used in cutting the two members of the tapered gear pair being of opposite hand and being given helical reciprocating movements of opposite hand but of equal lead.

16. The method of producing a pair of tapered gears which comprises generating each member of the pair conjugate to a cylindrical gear other than its mate by positioning a rotary tool of cylindrical gear form having helically arranged cutting teeth in engagement with a tapered gear blank so that the axis of the tool is offset from but angularly inclined to the axis of the blank, and imparting helical reciprocating movements to the tool about and along its axis while effecting a relative generating motion between the tool and blank as though the gear being cut were meshing with a cylindrical gear having teeth extending in the direction of its axis and described by the tool in its reciprocating movements.

17. In a machine for generating tapered gears, a base, a slide adjustable rectilinearly on the base, a cradle adjustable angularly on the slide, a work spindle journaled in the cradle with its axis intersecting the axis of adjustment of the cradle, a tool support adjustable angularly on the base about an axis inclined to the axis of adjustment of the cradle, a tool head mounted on the tool support, a tool spindle journaled in the tool head with its axis inclined to and intersecting the axis of adjustment of the tool support and extending in the direction of the axis of adjustment of the slide, and a reciprocatory tool of cylindrical gear form secured to the tool spindle.

ERNEST WILDHABER.

REFERENCES CITED

The following references are of record in the file of this patent:

UNITED STATES PATENTS

| Number | Name | Date |
|---|---|---|
| 1,365,433 | Wingqvist | Jan. 11, 1921 |
| 1,604,984 | Fornaca | Nov. 2, 1926 |
| 1,820,409 | Trbojevich | Aug. 25, 1931 |
| 1,995,327 | Simmons | Mar. 26, 1935 |
| 2,069,323 | Miller | Feb. 2, 1937 |
| 2,126,907 | Miller | Aug. 16, 1938 |
| 2,308,891 | Miller | Jan. 19, 1943 |

FOREIGN PATENTS

| Number | Country | Date |
|---|---|---|
| 249,576 | Great Britain | Mar. 25, 1926 |
| 513,007 | Great Britain | Oct. 2, 1939 |
| 705,002 | Germany | Apr. 22, 1941 |